United States Patent
Kobayashi et al.

(10) Patent No.: US 10,801,585 B2
(45) Date of Patent: Oct. 13, 2020

(54) FLEXIBLE EXTERNAL GEAR AND STRAIN WAVE GEARING

(71) Applicant: HARMONIC DRIVE SYSTEMS INC., Shinagawa-ku, Tokyo (JP)

(72) Inventors: Masaru Kobayashi, Azumino (JP); Tatsuro Hoshina, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 330 days.

(21) Appl. No.: 15/766,534

(22) PCT Filed: Nov. 6, 2015

(86) PCT No.: PCT/JP2015/081416
§ 371 (c)(1),
(2) Date: Apr. 6, 2018

(87) PCT Pub. No.: WO2017/077657
PCT Pub. Date: May 11, 2017

(65) Prior Publication Data
US 2018/0306276 A1    Oct. 25, 2018

(51) Int. Cl.
*F16H 1/32* (2006.01)
*F16H 55/08* (2006.01)
*F16H 49/00* (2006.01)

(52) U.S. Cl.
CPC ............ *F16H 1/32* (2013.01); *F16H 49/001* (2013.01); *F16H 55/0833* (2013.01); *F16H 55/08* (2013.01); *F16H 2049/003* (2013.01)

(58) Field of Classification Search
CPC ....... F16H 49/001; F16H 1/32; F16H 55/0833
See application file for complete search history.

(56) References Cited

U.S. PATENT DOCUMENTS 4,545,263 A    10/1985  Fickelscher
4,969,376 A *  11/1990  Fickelscher ........... F16H 49/001
                                                           475/180

(Continued)

FOREIGN PATENT DOCUMENTS

JP    48-45544       12/1973
JP    58-180858 A    10/1983

(Continued)

OTHER PUBLICATIONS

International Search Report (PCT/ISA/210) dated Dec. 8, 2015, by the Japanese Patent Office as the International Searching Authority for International Application No. PCT/JP2015/081416.

(Continued)

*Primary Examiner* — Terence Boes
(74) *Attorney, Agent, or Firm* — Buchanan Ingersoll & Rooney PC

(57) ABSTRACT

The flexible external gear of a strain wave gearing is provided with: a cylindrical body part capable of flexing in the radial direction; external teeth formed on the outer circumferential surface thereof with a constant pitch; and grooves formed on the inner circumferential surface of the cylindrical body section along the circumferential direction thereof with the same pitch as the external teeth. The grooves are grooves with a wave-shaped cross-sectional shape having the center line of the tooth crest of the external tooth as the center and extend in the width direction of the external teeth. It is possible to increase the tooth bottom fatigue strength of the flexible external gear by increasing the tooth bottom thickness, while maintaining ease of flexing and a tooth shape that can withstand tangential forces due to meshing.

8 Claims, 4 Drawing Sheets

(56) References Cited

U.S. PATENT DOCUMENTS

2010/0319484 A1* 12/2010 Kanai .................. F16H 55/0833
74/640
2012/0304791 A1* 12/2012 Ishikawa ............... F16H 49/001
74/412 R
2019/0368594 A1* 12/2019 Sakata ..................... B25J 9/042

FOREIGN PATENT DOCUMENTS

| JP | 2003-97654 A | 4/2003 |
| JP | 2009-257510 A | 11/2009 |
| JP | 2012-072912 A | 4/2012 |
| JP | 2013-177938 A | 9/2013 |

OTHER PUBLICATIONS

Written Opinion (PCT/ISA/237) dated Dec. 8, 2015, by the Japanese Patent Office as the International Searching Authority for International Application No. PCT/JP2015/081416.

* cited by examiner

FLEXIBLE EXTERNAL GEAR AND STRAIN WAVE GEARING

TECHNICAL FILED

The present invention relates to a flexible external gear of a strain wave gearing.

As strain wave gearings, there have been known a cup-type strain wave gearing having a cup-shaped flexible external gear, a top-hat-type strain wave gearing having a top-hat-shaped flexible external gear, and a flat-type strain wave gearing having a cylindrical flexible external gear, these types of strain wave gearings being described in Patent Documents 1, 2 and 3, for example. In a strain wave gearing, a flexible external gear is made to flex into a non-circular shape such as an ellipsoidal shape by a wave generator and partially meshes with a rigid internal gear. When the wave generator rotates, meshing portions between the both gears move in the circumferential direction.

In a strain wave gearing, the tooth bottom fatigue strength of a flexible external gear whose respective portions are repeatedly flexed in the radial direction by a wave generator, is affected by tensile stress generated in the tooth bottom of the flexible external gear due to an ellipsoidal flexural (bending) deformation thereof, and tensile stress generated in the tooth bottom due to load torque. The tooth bottom thickness of a flexible external gear in a current strain wave gearing is determined appropriately taking into consideration of these two factors.

PRIOR ART DOCUMENTS

Patent Documents

Patent document 1: JP 2013-177938 A
Patent document 2: JP 2012-072912 A
Patent document 3: JP 2009-257510 A

SUMMARY OF THE INVENTION

Problems to be Solved by the Invention

In a strain wave gearing, if only the tooth bottom thickness is increased in an attempt to improve the tooth bottom fatigue strength of a flexible external gear, tensile stress caused by load torque can be suppressed, but bending stress caused by the flexural deformation becomes large. Thus, there is a limit to the degree of improvement in the fatigue strength when merely the tooth bottom thickness is increased.

For example, reference is made to the tooth bottom thickness of the flexible external gear (F/S), and to the bending stress and the tooth bottom fatigue strength thereof caused by the flexural deformation in a currently-used strain wave gearing. A ratio of bending stress and a ratio of tooth bottom fatigue strength due to the flexural deformation are changed when the tooth bottom thickness is increased by 1.2 and 1.4 times, as shown in the following table.

| Ratio of F/S Tooth Bottom Thickness | Ratio of Bending Stress by Flexing | Ratio of Tooth Bottom Fatigue Strength |
| --- | --- | --- |
| 1 | 1 | 1 |
| 1.2 | 1.19 | 0.7 |
| 1.4 | 1.38 | 0.2 |

Thus, there is a limit to improvement in the fatigue strength of the flexible external gear of a strain wave gearing when only the tooth bottom thickness is increased.

An object of the present invention is to provide a flexible external gear of a strain wave gearing, which is able to improve the tooth bottom fatigue strength by increasing the tooth bottom thickness, while maintaining ease of flexing and maintaining the tooth profile that can withstand tangential force by meshing.

Another object of the present invention is to provide a flexible external gear of a strain wave gearing, whereby it is able to improve lubricity of contact parts with the bearing outer circumferential surface of a wave generator as well as enhancing the tooth bottom fatigue strength.

Means of Solving the Problems

In order to solve the above problems, according to the present invention, there is provided a flexible external gear of a strain wave gearing, in which the flexible external gear is made to flex in a radial direction by a wave generator and partially meshes with a rigid internal gear, the flexible external gear including:

a cylindrical body part capable of flexing in the radial direction;

external teeth formed on an outer circumferential surface of the cylindrical body part at a fixed pitch along a circumferential direction of the outer circumferential surface; and grooves formed on an inner circumferential surface of the cylindrical body part at a same pitch as that of the external teeth along a circumferential direction of the inner circumferential surface, wherein each of the grooves has a wave-shaped cross-sectional shape with a groove center line aligned to a center line of a tooth crest of each of the external teeth, the grooves extending in a tooth width direction of the external teeth.

In the flexible external gear of the present invention, the respective grooves are formed on the inner circumferential surface sections corresponding to the respective external teeth, and the flexible external gear is therefore easily flexed in the radial direction. Accordingly, in comparison with a flexible external gear without grooves on the inner circumferential surface thereof, it is possible to maintain the same degree of flexibility even if the tooth bottom thickness is increased, and suppress increase in the tensile stress due to the flexural deformation, whereby enhancing the fatigue strength.

Additionally, because the ease of flexing of the flexible external gear is maintained by the grooves formed on the inner circumferential surface of the flexible external gear, no changes made to the tooth profile of the external teeth formed on the outer circumferential surface are required. The tooth bottom thickness can be increased and a suitable shape can be adopted for the tooth profile of the external teeth, so that the deformation of the external teeth, which is caused by tangential force in meshing of teeth between the rigid internal gear, is also small.

In the grooves, the depth D measured from the inner circumferential surface along the groove center line is preferably $$(3d1+d2)/4 \leq D \leq (d1+3d2)/4$$

where d1 is the neutral-line diameter of the tooth bottom of the external teeth, and d2 is the tooth-bottom circle diameter.

The greater the depth D of the grooves, a flexible external gear becomes more flexible and the stress concentration factor of the dedendum of the external teeth becomes small.

In a case in which the depth D is smaller than the above range, when the tooth bottom thickness is increased, neither the ease of flexing of the flexible external gear in the radial direction can be maintained, nor the tooth bottom fatigue strength can be improved substantially, which is not desirable. Conversely, if the depth D is greater than the above range, each tooth having a wave shape becomes easy to bend by tangential force in the meshing between the teeth of the both gears, the spring constant is reduced, and ratcheting torque is also significantly reduced, which is not suitable for practical use.

When the depth of the grooves is set as described above, it is desirable that the wave-shaped cross-sectional shape of the grooves be defined by a first arc that is convex outwardly in the radial direction and has a radius R1 centered at a position on the groove center line, and a second arc that is concave inwardly in the radial direction and is smoothly connected to both the first arc and the inner circumferential surface. By defining the wave-shaped cross-sectional shape of the grooves with the first and second arcs, it is possible to avoid stress concentration occurred in portions where the grooves are formed.

All of the factors, namely, the radius R1 of the first arc, the radius R2 of the second arc and the depth D of the grooves have influence on the ease of flexing of the flexible external gear (tensile stress in the tooth bottom of the external teeth) and the ease of bending of each wave-shaped tooth. Once the radius R1 and the depth D are determined, the radius R2 is determined. As the dept D of the grooves is large, and as the first radius R1 of the first arc is large, the radius R2 of the second arc becomes smaller, and the flexible external gear becomes more flexible.

It is desirable for the radius R1 of the first arc to have a length that is (0.4±0.1) times the module of the external teeth. As mentioned earlier, as the radius R1 becomes large, the radius R2 becomes small and the flexible external gear becomes more flexible. When the radius R1 is larger than the above value, the equivalent thickness of the tooth bottom of the flexible external gear is greatly affected, to cause decrease in the fatigue strength, which is not desirable. Conversely, when the radius R1 is smaller than the above value, stress concentration becomes large, to cause the fatigue strength to decrease, which is also undesirable. For example, when the flexible external gear is flexed into an ellipsoidal shape, the fatigue strength thereof is decreased by the tensile stress at the minor axis side of the ellipsoidal shape.

Here, a wave generator is fitted on the circular inner circumferential surface of the flexible external gear, which is flexed into a non-circular shape such as an ellipsoidal shape, and in this state, the wave generator rotates. The grooves are formed on the inner circumferential surface of the flexible external gear where the bearing outer circumferential surface of the wave generator is in contact, and the grooves function as a lubricant reservoir. Because it is possible to improve lubricity of the contact portion between the inner circumferential surface of the flexible external gear and the bearing outer circumferential surface of the wave generator, the rolling fatigue strength of these parts can be enhanced.

Next, a strain wave gearing of the present invention is characterized by having a rigid internal gear, a flexible external gear provided with the above configuration, and a wave generator for flexing the flexible external gear in a radial direction to partially mesh with the rigid internal gear, and moving meshing positions between the rigid internal gear and the flexible external gear in a circumferential direction.

Because the flexible external gear is provided with the grooves and the fatigue strength thereof can be enhanced by increasing the tooth bottom thickness, it is possible to realize a strain wave gearing having excellent durability as a whole.

MODE FOR CARRYING OUT THE INVENTION

Hereinafter, an embodiment of a strain wave gearing according to the present invention will be described with reference to the drawings. Although the following embodiment relates to a cup-type strain wave gearing, the present invention is also applicable to a top-hat-type strain wave gearing and a flat-type strain wave gearing in the same manner.

Figure 1:
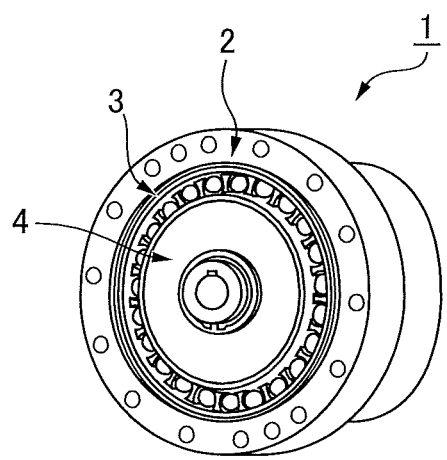
FIG. 1 is a perspective view showing a strain wave gearing according to the present invention.

FIG. 1 is a perspective view of a strain wave gearing according to the embodiment, and FIG. 2(a) is a longitudinal cross-sectional view thereof and FIG. 2(b) is a lateral cross-sectional view thereof. The strain wave gearing 1 is provided with an annular rigid internal gear 2, a cup-shaped flexible external gear 3 coaxially arranged inside the rigid internal gear, and a wave generator 4 fitted into the flexible external gear. The flexible external gear 3 is made to flex into a non-circular, for example, an ellipsoidal shape by the wave generator 4, so that external teeth 14 mesh with internal teeth 2a on both ends of the major axis L1 of the ellipsoidal shape.

When the wave generator 4 is rotated by a motor or the like (not shown), meshing positions between the two gears 2 and 3 move in the circumferential direction. When the meshing positions rotate once, relative rotation corresponding to the difference in the number of teeth between the two gears is generated between the two gears. The rotation of the wave generator 4 can be derived from one of the two gears as a reduce-speed rotation that is significantly reduced in speed.

The flexible external gear 3 is provided with a cylindrical body part 11 capable of flexing in the radial direction, a disc-shaped diaphragm 12 which extends radially and inwardly from the rear end of the cylindrical body part 11, an annular boss 13 which is a rigid body and is connected to an inner circumferential edge of the diaphragm, and external teeth 14 formed on the outer circumferential surface portion at the side of the open end of the cylindrical body part 11. The wave generator 4 is provided with a cylindrical hub 21, a cam plate 22 attached to the outer circumferential surface of the hub, and a bearing 23 mounted on an ellipsoidal outer circumferential surface of the cam plate 22. An external-tooth-forming portion 15 of the cylindrical body part 11 where the external teeth 14 are formed is flexed into an ellipsoidal shape by the wave generator 4. A bearing retainer of the bearing 23 is omitted to illustrate in FIG. 2(b).

Figure 3:
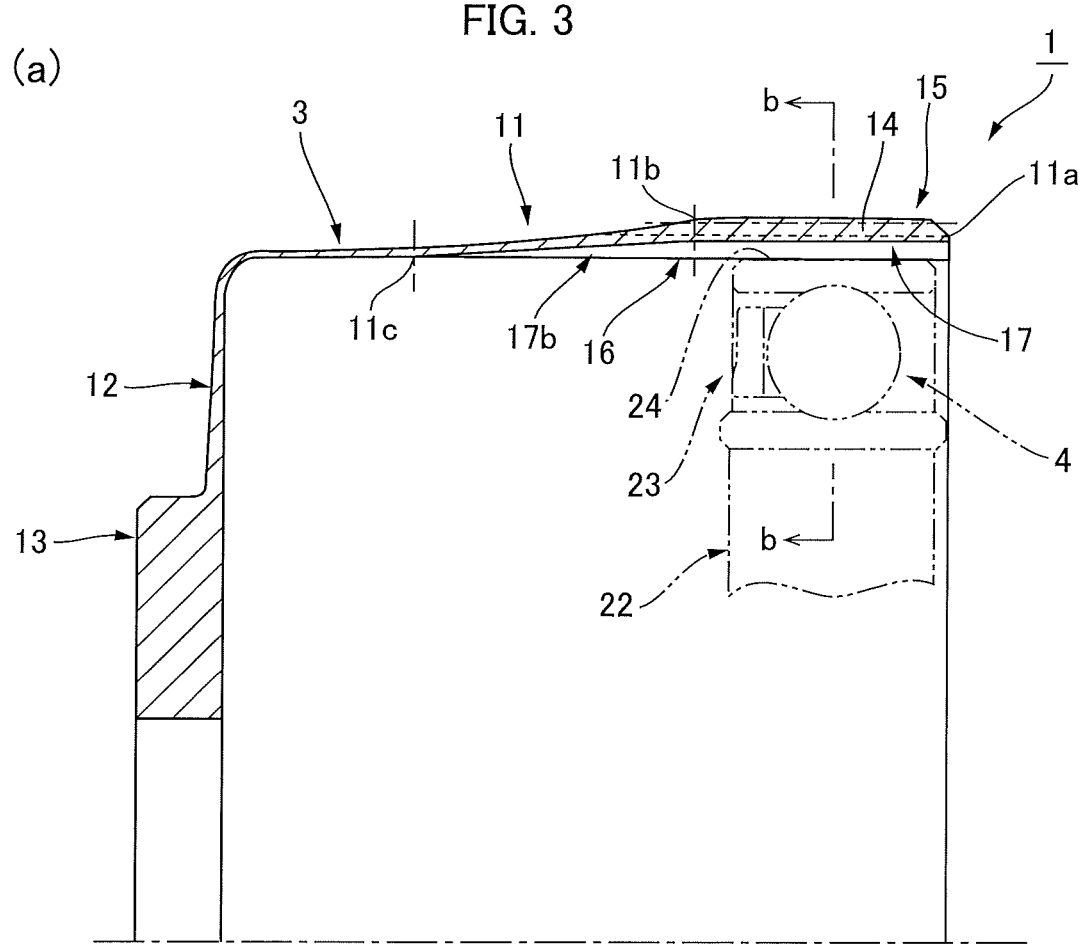
FIGS. 3(a)-3(c) includes a half longitudinal cross-sectional view of the flexible external gear of FIG. 1, a schematic view showing a portion cut along b-b line, and an explanatory view showing a groove part formed in a flat-type flexible external gear.
Figure 3:
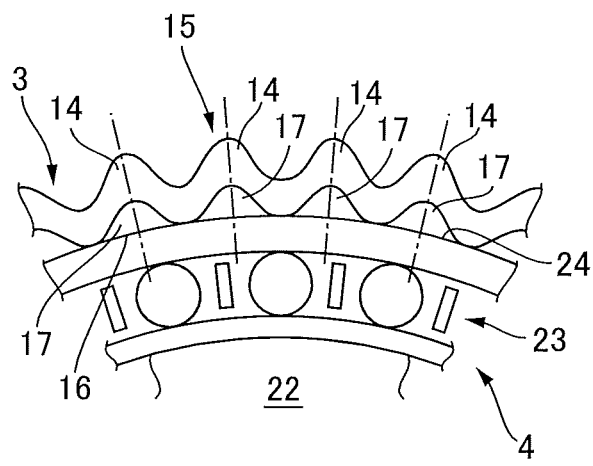
Figure 3:
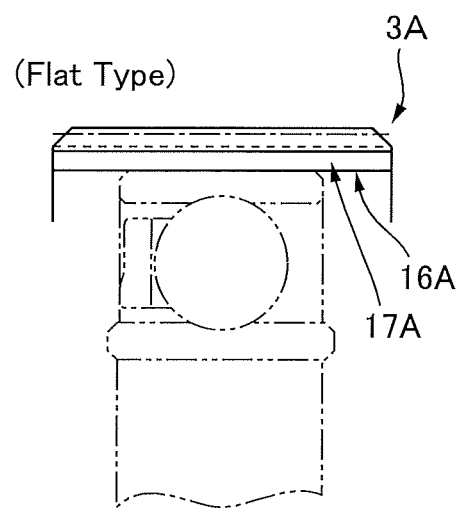

FIG. 3(a) is a half longitudinal cross-sectional view of the external-tooth-forming portion 15, and FIG. 3(b) is a schematic view showing the lateral cross section of a portion cut along b-b line thereof. As shown in these drawings, the external teeth 14 having a prescribed module are formed on an outer circumferential surface of the external-tooth-forming portion 15 of the cylindrical body part 11 of the flexible external gear 3, at a fixed pitch along the circumferential direction of the outer circumferential surface. Additionally, an inner circumferential surface 16 of the external-tooth-forming portion 15 is formed with grooves 17 at the same pitch as the external teeth 14 along the circumferential direction of the inner circumferential surface. The grooves 17 are those having a wave-shaped cross section and extending linearly in the tooth width direction of the external teeth 14.

For example, the grooves 17 are formed on the inner circumferential surface 16 of the external-tooth-forming portion 15, the forming range of which encompasses the meshing portion of the both teeth (the range being from the open end 11a to the diaphragm-side end of the external teeth 14). In other words, the grooves 17 having a fixed depth and a fixed width extend from the open end 11a to a position 11b. Extended groove portions 17b are also formed continuously from the grooves 17 and is extended from the position 11b until to a middle way 11c toward the side of the boss 13 in a manner that the depth and the width of the extended groove portions are gradually decreased.

The grooves 17 are formed in an area that encompasses the meshing portions of the both gears on the inner circumferential surface 16 of the external-tooth-forming portion 15. The extended groove portions 17b are formed so as to eliminate or reduce the influence caused by the provision of the grooves 17 to the cylindrical body part 11 and the diaphragm 12.

When the present invention is applied to a flat-type strain wave gearing, grooves having a fixed depth and a fixed width may be formed across the entire width of the inner circumferential surface of the external-tooth-forming portion of the flexible external gear. FIG. 3(c) is an explanatory view showing grooves formed on a flat-type flexible external gear. As shown in this figure, the grooves 17A having a fixed depth and a fixed width are formed across the entire width of the inner circumferential surface 16A of the flexible external gear 3A of a flat type (a cylindrical shape).

Figure 4:
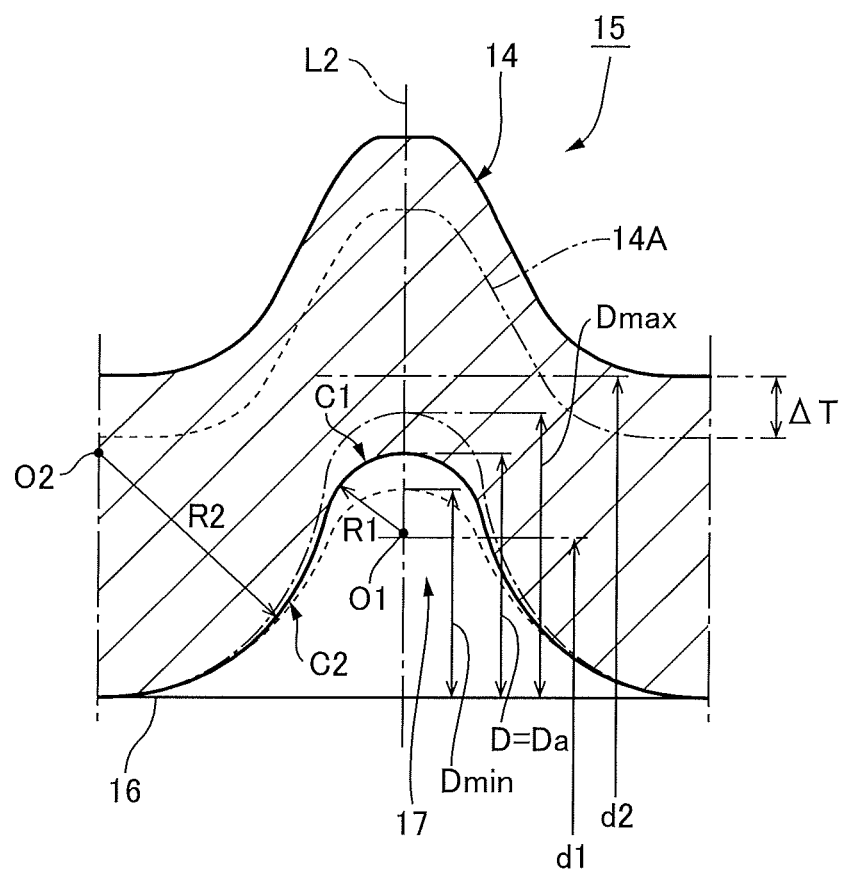
FIG. 4 is an enlarged partial lateral cross-sectional view showing an external tooth of the flexible external gear of FIG. 1.

FIG. 4 is an enlarged partial lateral cross-sectional view showing a part of one tooth of the external-tooth-forming portion 15. As shown in this figure, each groove 17 is a groove that has a wave-shaped cross-sectional shape and has a groove center line aligned to a tooth-crest center line L2 of the external tooth 14.

Specifically, the maximum depth of the groove 17 is the depth D measured from the inner circumferential surface 16 on the groove center line (L2). The depth D is set to have a value within the range defined by the following conditional expression, where d1 is the tooth-bottom neutral-line diameter of the external teeth 14 and d2 is the tooth-bottom circle diameter.

$$(3d1+d2)/4 \leq D \leq (d1+3d2)/4$$

If the depth D is smaller than $(3d1+d2)/4$, when the tooth bottom thickness is increased, the flexibility of the flexible external gear 3 in the radial direction cannot be maintained, and the tooth bottom fatigue strength cannot be improved. If the depth D is greater than $(d1+3d2)/4$, although the flexibility of the flexible external gear 3 can be maintained even if the tooth bottom thickness is increased, deformation of the external teeth due to tangential force in meshing becomes large and therefore ratcheting torque is greatly reduced, which is not suitable for practical use.

In the present example, the depth D is set to be a standard depth Da which is, for example, a middle value between the maximum value and the minimum value of the above conditional expression as shown by the solid line in FIG. 4.

$$Da=(d1+d2)/2$$

In the drawing, the dotted line Dmin shows an example of a cross-sectional shape of the groove in which the depth is set to be the minimum value of the above conditional expression, and the chain line Dmax is an example of a cross-sectional shape of the groove in which the depth is set to be the maximum value of the above conditional expression.

Next, the wave-shaped cross-sectional shape of the groove 17 is defined by a first arc C1 which has a radius R1 about a center O1 positioned on the groove center line (L2) and is convex outwardly and radially, and a second arc C2 which is smoothly connected to both the first arc C1 and the inner circumferential surface 16 of the external-tooth-forming portion 15 and is convex inwardly and radially. The radius R1 is set to be a length that is $(0.4\pm0.1)$ times the module of the external teeth.

The second arc C2 is an arc having a center O2 positioned on the tooth space center line of the external teeth 14, the size (the radius R2) of which is determined by the inner diameter d3 of the inner circumferential surface 16, the depth D of the grooves 17, and the radius R1 of the first arc C1. The smaller the second arc C2 becomes, the more flexible in the radial direction the flexible external gear 3 becomes.

It is possible to avoid stress concentration on the portion where the grooves 17 are formed by using the first and second arcs C1 and C2 to define the wave-shaped cross-sectional shape of the grooves 17. The stress concentration on the bottom portions of the grooves 17 can also be avoided by setting the radius R1 defining the bottom surface of the grooves 17 to be a length that is $(0.4\pm0.1)$ times the module of the external teeth 14.

For example, an existing flexible external gear provided with external teeth 14A having a contour shown by an imaginary line in FIG. 4 is modified so that the tooth bottom thickness is increased by $\Delta T$ as shown by the solid line and the grooves 17 are formed on the inner circumferential surface 16, whereby obtaining the flexible external gear 3 of the present example. It is possible for the flexible external gear 3 to increase the tooth bottom thickness thereof without modifying the tooth profile of the external teeth of the existing flexible external gear. Further, even when the tooth bottom thickness is increased, the ease of flexing into an ellipsoidal shape can be maintained to be the same degree as the existing flexible external gear, so that increase in tensile stress due to the flexure deformation can be limited. Accordingly, the fatigue strength of the flexible external gear 3 can be enhanced in comparison with the existing flexible external gear.

Figure 2:
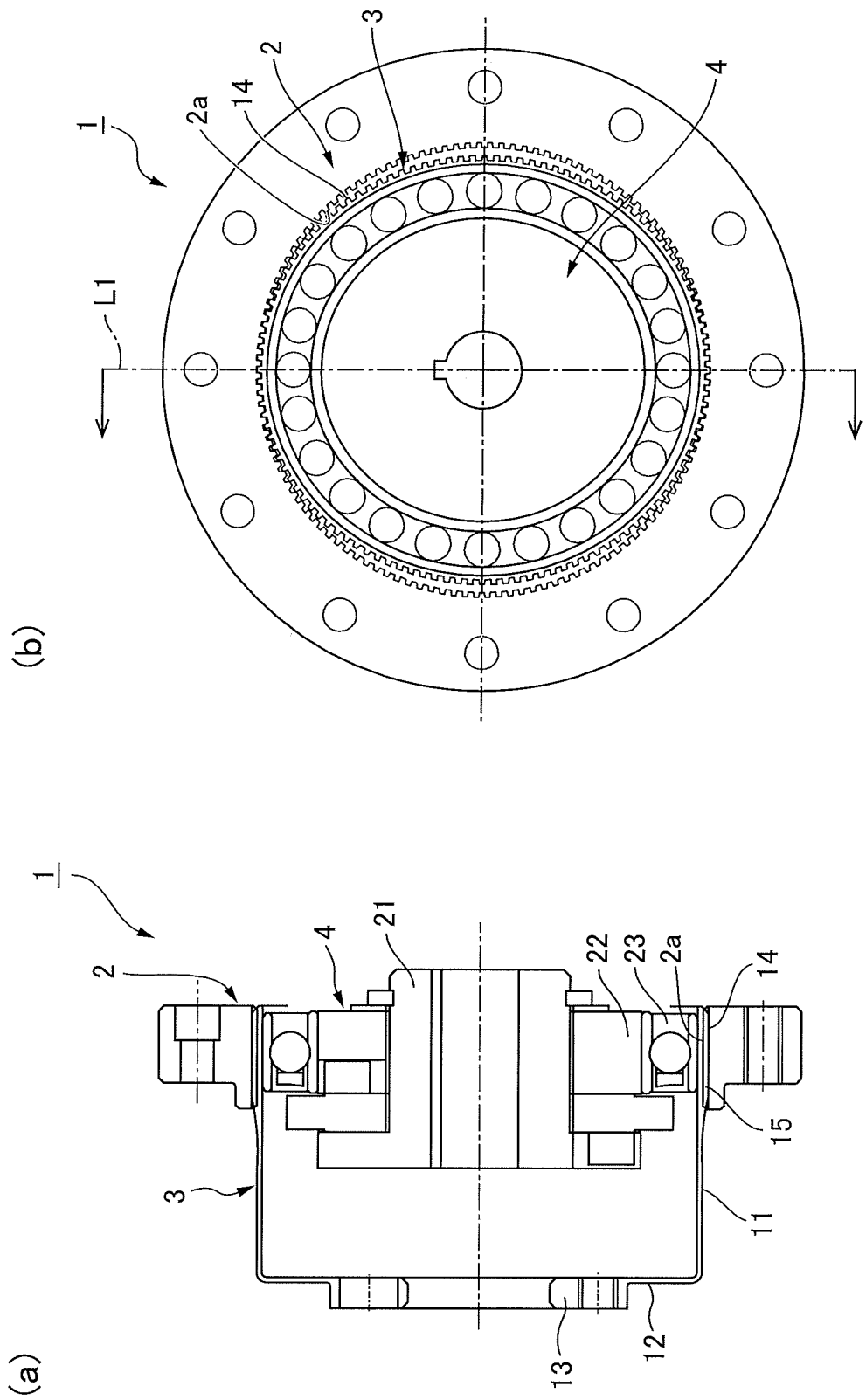
FIGS. 2(a) and 2(b) includes a longitudinal cross-sectional view and a lateral cross-sectional view of the strain wave gearing of FIG. 1.

Additionally, as described with reference to FIGS. 1 and 2, the wave generator 4 is fitted on the inner circumferential surface 16 of the flexible external gear 3; the external-tooth-forming portion 15 of the flexible external gear 3 is flexed into an ellipsoidal shape by the wave generator 4; and the wave generator 4 is rotated in this state. The grooves 17 are formed at a constant pitch on the inner circumferential surface 16 of the flexible external gear 3 where the bearing outer circumferential surface 24 of the wave generator 4 is in contact as shown in FIGS. 3(a)-3(c) according to the present example. Accordingly, the grooves 17 function as a lubricant reservoir, so that lubrication of the contact part between the inner circumferential surface 16 of the flexible external gear 3 and the bearing outer circumferential surface 24 of the wave generator 4 is improved. This can improve the rolling fatigue strength of the contact part.

The invention claimed is:

1. A flexible external gear of a strain wave gearing, in which the flexible external gear is flexed in a radial direction by a wave generator to partially mesh with a rigid internal gear, the flexible external gear comprising:
   a cylindrical body part capable of flexing in the radial direction;
   a disc-shaped diaphragm extending inwardly or outwardly in the radial direction from one end of the cylindrical body part;
   external teeth that are formed on an outer circumferential surface portion at a side of the other open end of the cylindrical body part, and are formed at a constant pitch along a circumferential direction of the outer circumferential surface; and
   grooves formed on an inner circumferential surface of the cylindrical body part at a same pitch as that of the external teeth along a circumferential direction of the inner circumferential surface,
   wherein each of the grooves has a wave-shaped cross-sectional shape with a groove center line that is a tooth crest center line of each of the external teeth, and extends from the open end to a position corresponding to an end in a tooth trace direction of the external teeth at a side of the diaphragm, and
   extended groove portions are formed continuously from the grooves on the inner circumferential surface, in which the extended groove portions are formed until to a middle way toward the diaphragm side so that a depth and a width of the extended groove portions are gradually decreased.

2. The flexible external gear of the strain wave gearing according to claim 1,
   wherein a depth D of the grooves measured from the inner circumferential surface on the groove center line is defined by $(3d1+d2)/4 \leq D \leq (d1+3d2)/4$, where d1 is a tooth-bottom neutral-line diameter and d2 is a tooth-bottom circle diameter.

3. The flexible external gear of the strain wave gearing according to claim 2,
   wherein the wave-shaped cross-sectional shape of the grooves is defined by:
   a first arc that has a radius R1 centered at a position on the groove center line and is convex outwardly in the radial direction; and
   a second arc that is convex inwardly in the radial direction and is smoothly connected to the first arc and to the inner circumferential surface, respectively, and
   wherein the radius R1 has a length that is $(0.4\pm0.1)$ times a module of the external teeth.

4. The flexible external gear of the strain wave gearing according to claim 1,
   wherein the grooves are a lubricant reservoir.

5. A strain wave gearing comprising:
   a rigid internal gear;
   the flexible external gear as set forth in claim 1; and
   a wave generator for flexing the flexible external gear in a radial direction to partially mesh with the rigid internal gear, and for moving meshing positions of the rigid internal gear and the flexible external gear in a circumferential direction.

6. A strain wave gearing comprising:
   a rigid internal gear;
   the flexible external gear as set forth in claim 2; and
   a wave generator for flexing the flexible external gear in a radial direction to partially mesh with the rigid internal gear, and for moving meshing positions of the rigid internal gear and the flexible external gear in a circumferential direction.

7. A strain wave gearing comprising:
   a rigid internal gear;
   the flexible external gear as set forth in claim 3; and
   a wave generator for flexing the flexible external gear in a radial direction to partially mesh with the rigid internal gear, and for moving meshing positions of the rigid internal gear and the flexible external gear in a circumferential direction.

8. A strain wave gearing comprising:
   a rigid internal gear;
   the flexible external gear as set forth in claim 4; and
   a wave generator for flexing the flexible external gear in a radial direction to partially mesh with the rigid internal gear, and for moving meshing positions of the rigid internal gear and the flexible external gear in a circumferential direction.

* * * * *